Jan. 23, 1968  D. E. ETHERTON, SR  3,364,769
VEHICLE SPEEDOMETER CONTROLLING ATTACHMENT
Filed May 9, 1966  2 Sheets-Sheet 2

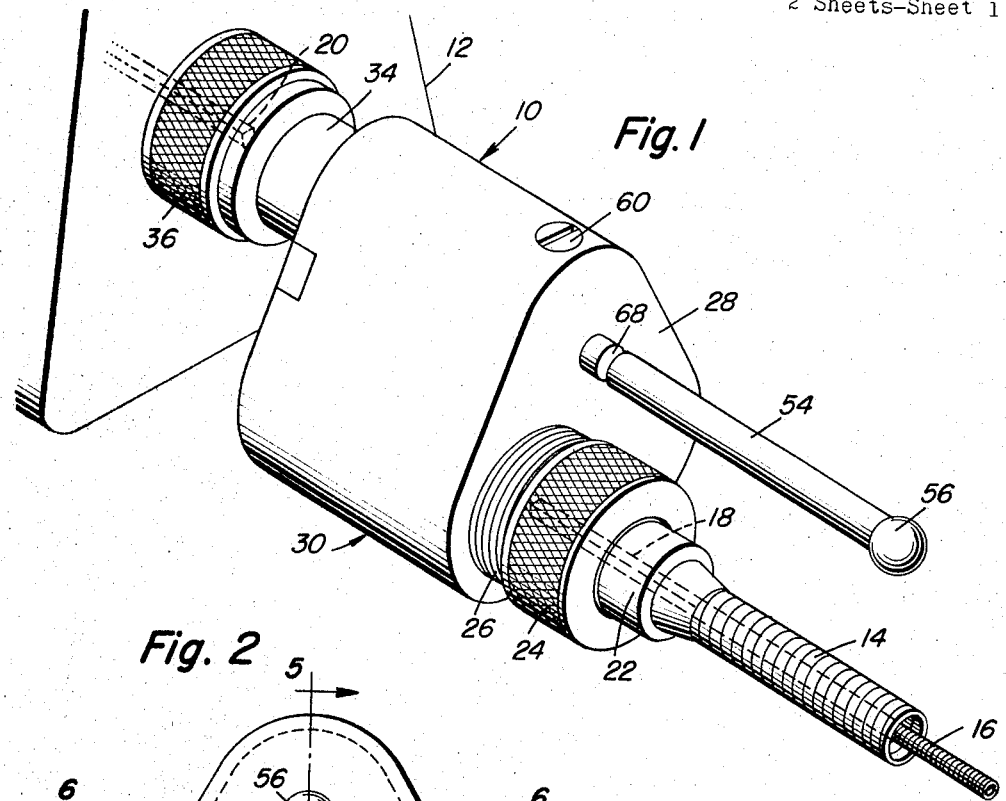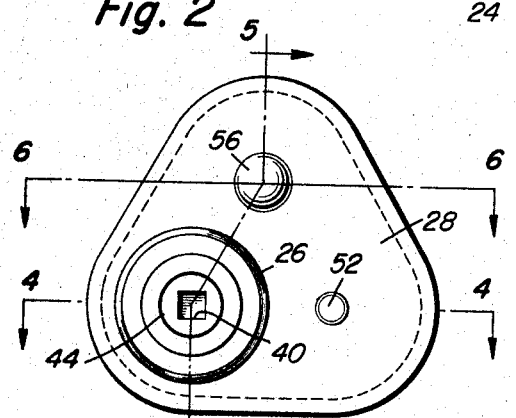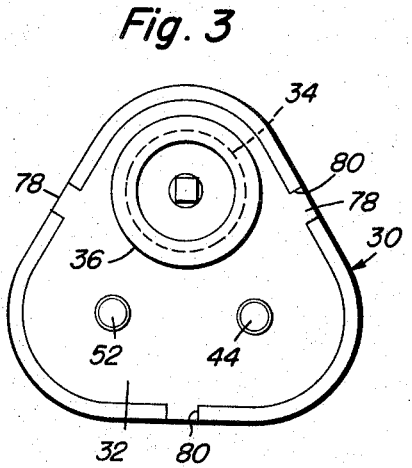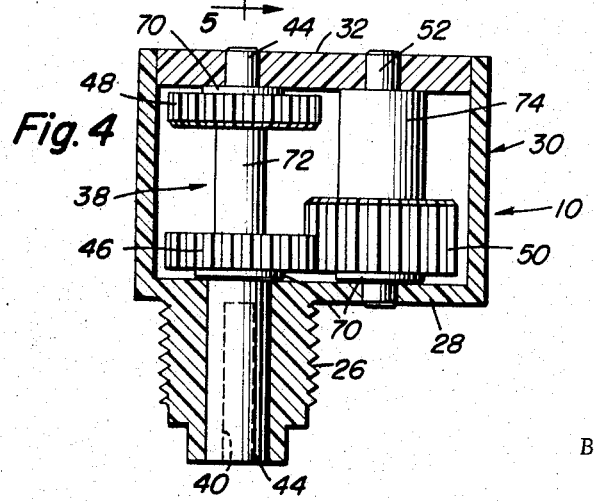

INVENTOR
Don E. Etherton, Sr.

BY Gustave Miller
ATTORNEY

United States Patent Office 3,364,769
Patented Jan. 23, 1968

3,364,769
VEHICLE SPEEDOMETER CONTROLLING ATTACHMENT
Don E. Etherton, Sr., 3816 Greenwich Road, Louisville, Ky. 40218
Filed May 9, 1966, Ser. No. 548,468
5 Claims. (Cl. 74—355)

ABSTRACT OF THE DISCLOSURE

This invention provides to a vehicle speedometer controlling attachment which may be readily temporarily attached between the speedometer head and speedometer shaft of a vehicle so that the odometer reading in the speedometer may be easily controlled, maintained at zero milage, permitted to advance, or may be readily restored to zero mileage without the necessity of removing the speedometer head for resetting the milage reading.

Object of invention

It is particularly intended for use by automobile dealers, for temporary insertion in new and demonstrator vehicles before they are delivered to the customers, so that the customer may have his car, when delivered to him, have a zero milage setting on the odometer portion of the speedometer, for many car owners prefer that the odometer part should show only just how much milage the car accumulates while in their possession. With this invention, the milage setting may be controlled or restored to a zero mile setting by setting it to "Reverse" and then when zero is reached, shifting it to neutral to thus maintain it at the zero setting until the car is about to be delivered, whereupon it is readily removed, and the speedometer cable is reconnected for normal operation.

In brief, this invention includes a reversible gear train mounted in a housing and provided with a cap nut at one end of the train and a complementary threaded boss at the other end of the gear train, a male shaft at the cap nut end of the gear train complementary to the female shaft in the vehicle speedometer head, and a corresponding female shaft at the threaded boss end of the gear train complementary to the male shaft end of the speedometer cable. The gear train itself includes a pair of spaced apart gears fixed on the female shaft with a similar but wider gear fixed on a second shaft permanently in mesh with one of the spaced apart gears, and a third gear shaft, which third shaft terminates in the male shaft mentioned above, this third shaft carrying a gear fixed thereon, this third shaft being slidably shiftable from a position meshable with the wider shaft through a neutral or disengaged position to a position meshing with the meshed spaced apart gear, this shiftable gear shaft having its other end extending from the housing and providing a manual operating handle. This third shaft is also provided with three circumferential recesses cooperating with a spring pressed ball detent in the housing to maintain this shaft in the selected one of the three positions. The three shafts are arranged in an equilateral triangle relation to each other, all the gears thereon having the same number of teeth of the same pitch and diameter, and thus transmit the motion at a one-to-one ratio in either direction. So as to occupy a minimum of space and thus be readily usable in most or all different makes of vehicles, the housing side walls may also be equilateral triangular in outline, with round corners, and the other part of the housing has three sides walls with round edges corresponding to the sides. The material of the housing, the side walls, the gear shafts and the gears may all be of appropriate plastic materials, such as nylon or high impact plastic. The term "speedometer" or "vehicle speedometer" as herein used includes the conventional odometer used in all vehicle speedometers, and it is the odometer part thereof that is affected by the use of this invention.

To facilitate shifting, at least one of the gear edges, engaged by the shifting gear in either direction, is beveled.

With the above and related objects in view, this invention consists in the details of construction and combination of parts, as will be more fully understood from the following description, when read in conjunction with the accompanying drawing, in which:

FIG. 1 is a perspective view of the vehicle speedometer attachment of this invention attached in operative position.

FIG. 2 is a front elevational view thereof, in detached position.

FIG. 3 is a rear elevational view thereof.

Figure 5:
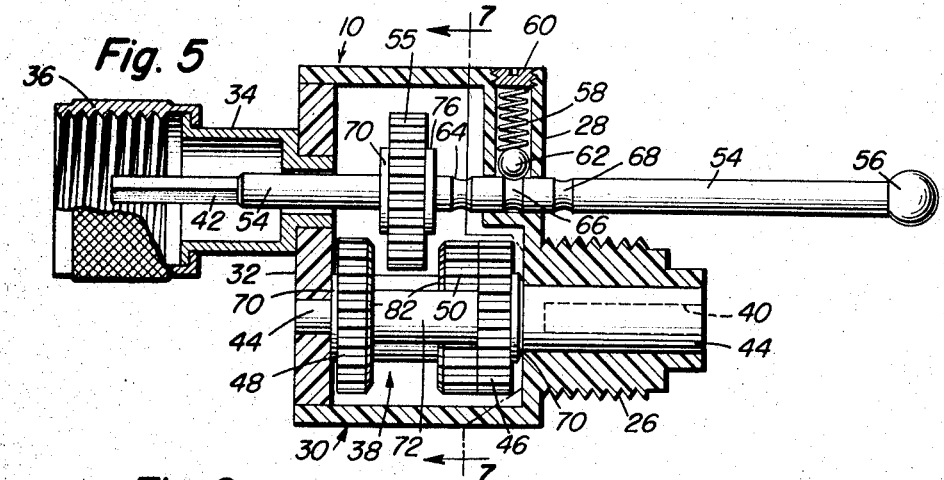
Figure 6:
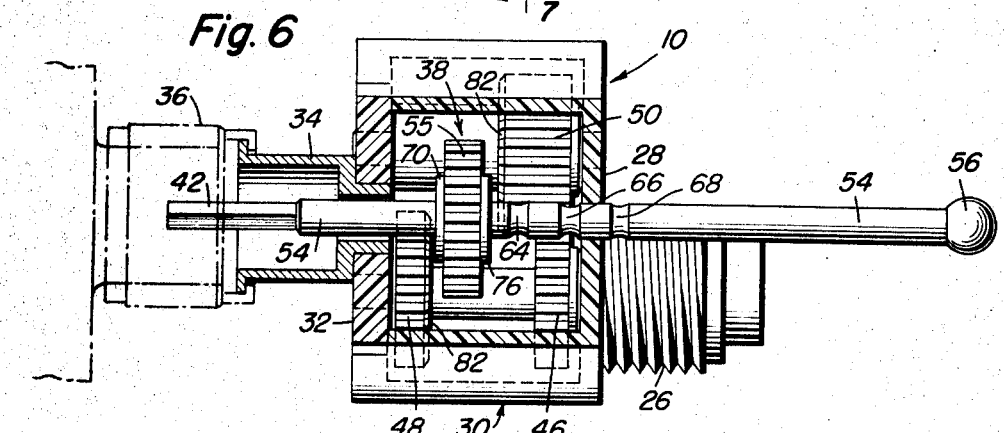

FIGS. 4, 5 and 6 are sectional views on lines 4—4, 5—5 and 6—6 of FIG. 2, respectively.

Figure 7:
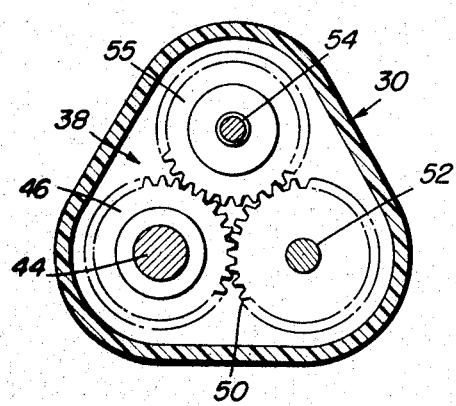

FIG. 7 is a sectional view on line 7—7 of FIG. 5.

Figure 8:
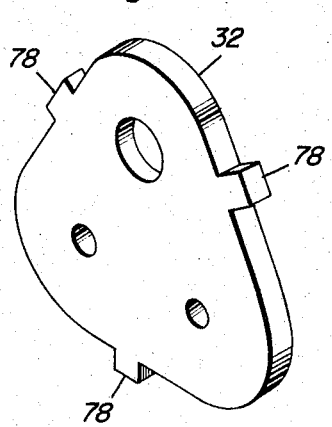

FIG. 8 is a perspective view of the housing rear side attachable wall.

There is shown at 10 the vehicle speedometer controlling attachment of this invention as temporarily attached in operative position between a speedometer head 12 and a speedometer cable sleeve 14 through which extends and rotates the speedometer cable 16 on the end of which is the squared male shaft 18 which shaft 18 is complementary to the female shaft 20 of the speedometer head 12. The cable sleeve 14 terminates in a ferrule 22 on which is rotatably mounted a cap nut 24 complementary to and for attachment to the conventional speedometer head threaded boss, not shown, but similar to the threaded boss 26 extending from the front side wall 28 of the attachment housing 30. A rear side wall 32, shown separately in FIG. 8, completes the housing 30. As shown in FIG. 5, side wall 32 has a ferrule 34 similar to ferrule 22, and provided with a cap nut 36 for attachment on the complementary threaded boss on speedometer head 12.

A reversible gear train 38 mounted in housing 30 transmits rotary motion from the male shaft 18 at the end of cable 16 extending into a female shaft 40 at one end of the gear train 38, similar to female shaft 20 of head 12, and at the other end of the gear train 38, a squared male shaft end 42, transmits motion to the female shaft 20 in the head 12. Conventionally, the cap nut 24 is attached to the threaded boss on head 12 and holds squared male shaft 18 of the speedometer cable 16 in the squared female shaft 20 of head 12, but when this attachment is in place as just described, the gear train 38 is interposed between the cable male shaft 18 and the head female squared shaft 20, at the same one-to-one ratio.

The squared female shaft 40 is an integral part of a gear shaft 44 journaled at one end in the threaded boss 26 and at its other end in the attached housing side wall 32, and fixed on this gear shaft 44, one adjacent each side wall 28 and 32, is a pair of spaced apart gears 46 and 48. Gear 46 is in permanent mesh with a gear 50, of greater width than gear 46, and fixed on its own shaft 52 journaled between side walls 28 and 32.

A third gear shaft 54, with which squared male shaft end 42 is integral, slidably extends through side 28 of the housing 30, its position forming an equilateral triangle with the other two gear shafts 44 and 52, thus permitting the housing 30 to have only three sides connected by round ends, closed in by the two opposite side walls 28 and 32, and thus occupying a minimum of space, and making the attachment usable on most makes of automobiles or other vehicles. On this third, slidable shaft 54 there is fixed a similar gear 55 so located that it may be held between the two spaced apart gears 46 and 48, thus providing a neutral position, or meshed with gear 48, thus reversing the direction of rotation, or meshed with the greater width portion of gear 50 thus providing a direct, same direction, rotation. The gear shaft 54 is manually moved to selected position, forward, neutral or reverse, by pulling or pushing the handle knob 56 on the end opposite the squared male shaft end 42, and is held in the selected position by means of the yieldable springs 58 held in a shaftway within the housing integral side 28 by a stud screw 60 against a ball detent 62 cooperating with a selected one of three circumferential recesses on the shaft 54, a forward recess at 64, a neutral recess at 66 and a reverse recess at 68. The squared male end 42 is of a length to extend into the female squared shaft 20 at all positions. To assist in fixing the gears on their respective shafts, they are provided with flanges 70 or sleeves 72, 74 and 76 holding them in position on the shafts. On the shifting shaft 54, the sleeve 76 performs the additional function of abutting the inside of the housing integral side 28, thus preventing the shifting gear 55 from meshing with gear 46, which would make it inoperative and break the gears. All the gears may be made of nylon or other suitable plastic for long life, and the housing, the shafts, and all parts may be made of suitable high impact, plastic, nylon, or the like. To facilitate assembly, the separate side 32 is provided with extending tabs 78 received within and held in suitable slots 80 in the ends of the housing 30, in any convenient manner, such as plastic glue or the like.

To facilitate shifting the gear 55 into mesh with either greater width gear 50 or unmeshed gear 48, the adjacent edges of each gear 50 and 48 are beveled as shown. Inasmuch as squared male end 42 of shaft 54 is slidably mounted in the squared female shaft 20 of head 12 when in operation, it is kept free of contact with the inside of ferrule 34 thus reducing friction during operation.

In operation, this vehicle speedometer reversing attachment is normally used on new cars or demonstrators in the hands of the automobile dealers, and is not intended for use by the general public or private automobile owner. When new cars are delivered to a dealer, they often have from about three to twenty miles on the speedometer. It is usually desired that the car when delivered to the purchaser should have a zero setting on the speedometer, and to do so normally, without this invention, it is necessary to take off and open up the speedometer head 12, a time consuming and tedious job.

With this invention, the speedometer cable cap nut 24 is disconnected from the threaded boss on the head 12, the male shaft 18 is withdrawn from the female shaft 20, and this attachment is attached by inserting the male squared shaft 42 in the female shaft 20 of the head 12 and held therein by connecting the cap nut 36 on the threaded boss of head 12. Then the speedometer cable male shaft 18 is inserted into female shaft 40 of this attachment 10 and held therein by securing the speedometer cable nut 24 to the attachment threaded boss 26. When in forward position, milage will accumulate on the speedometer as long as desired. Then, by means of the handle knob 56, shaft 54 may be moved to the reverse position, and kept there while the car is being driven for testing or demonstrating purposes until the speedometer reaches the zero milage setting, whereupon the shaft 54 is shifted to the neutral position, and left there until the car is to be delivered to the purchaser, at which time the attachment is removed and the cable 16 is again reconnected to the speedometer head 12 in an obvious manner.

In the drawings, like numbers refer to like parts, and for the purposes of explication, marshalled below are the numbered parts of the improved Vehicle Speedometer Controlling Attachment:

10—Vehicle speedometer controlling attachment.
12—Speedometer head.
14—Speedometer cable sleeve.
16—Speedometer cable.
18—Squared male shaft on 16.
20—Squared female shaft on head 12.
22—Cable sleeve ferrule.
24—Cap nut on 22 complementary to 26 and to threaded boss on 12.
26—Threaded boss on 28.
28—Front side wall integral with housing 30.
30—Housing.
32—Rear side wall attachable to 30.
34—Ferrule on 32.
36—Cap nut on 34 complementary to boss on 12.
38—Reversible gear train.
40—Squared female shaft of 38.
42—Squared male shaft end of 38.
44—Shaft for spaced apart gears 46 and 48, integral with 40.
46—Permanently meshed spaced apart fixed gear on 44.
48—Other gear fixed on 44.
50—Greater width gear fixed on shaft 52.
52—Shaft for 50.
54—Third gear shaft.
55—Shifting gear fixed on shaft 54.
56—Handle knob on end of 54.
58—Yieldable spring.
60—Stud screw.
62—Ball detent.
64—Forward position recess on shaft 54.
66—Neutral position recess on shaft 54.
68—Reverse position recess on shaft 54.
70—Gear holding flanges on all shafts.
72—Gear holding sleeve on shaft 44.
74—Gear holding sleeve on shaft 50.
76—Gear holding sleeve on shaft 54, also preventing improper meshing.
78—Tabs extending from edges of side 32.
80—Slots in housing 30 to receive tabs 78.
82—Bevel edges on gears 48 and 50 facilitating meshing when shifting.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. For use when connected between the speedometer head (12) and the speedometer cable (16) of a vehicle, for controlling the reading on the speedometer head, wherein the improvement comprises
   an attachment (10) comprising a gear train housing (30),
   a gear train (38) mounted therein,
   a manually shiftable gear (55) included in said gear train,
   and means (26, 36) for attaching said gear train in operative connection between the speedometer head (12) and cable (16),
   and means (54, 58, 62, 64, 66) for maintaining said shiftable gear in manually set position,
   said gear train attachment means (10) comprising a male shaft (54) on which said manually shiftable gear (55) is fixedly mounted,
   said male shaft having one end (42) extending through one side (32) of said housing (30),
   said extending end being complementary to a female operating element (20) of the speedometer head (12),
   the opposite end (56) of said male shaft (54) extending through the opposite side (28) of said housing providing a manipulating handle (56),
   and a female element (40) operatively connected to said gear train (38) extending through said opposite side (28) of said housing,
said female element being complementary to the vehicle speedometer operating shaft (18).

2. The attachment of claim 1, said attaching means (26, 36) also including
a hollow, externally threaded boss (26) on said housing (30) complementary to the vehicle speedometer cable attaching cap nut (24),
said gear train female element (40) being journaled through said hollow boss (26),
and a similar vehicle speedometer attaching nut (36) operatively connected (34) to said housing (30) concentrically about said complementray extending male shaft (42).

3. The attachment of claim 2, said gear train (38) comprising
a pair of spaced apart gears (46, 48), each somewhat similar to said shiftable gear (55),
fixed (70) on a shaft (44) journaled in opposite sides (28, 32) of said housing (30),
said shaft having one end (44) extending through housing side (28) concentrically within said hollow boss (26),
said female element (40) of said gear train (38) being provided within said extending shaft end (44),
said pair of gears being spaced apart a distance greater than the width of said shiftable gear (55),
another gear (50), of a width greater than that of said aforesaid gears (46, 48, 55) fixed (74, 70) on another shaft (52) journaled in said housing opposite sides (28, 32) and in permanent mesh with one (46) of said spaced apart gears,
said greater width gear (50) having its greater width portion extending, free of mesh contact, toward said other spaced apart gear (48),
said shiftable gear (55) being shiftable to mesh with said greater width portion for rotation in one direction,
or to a disengaged, neutral position between said greater width gear (50) and the unmeshed gear (48) of said spaced apart gears,
or to a meshing position with said unmeshed gear (48) for rotation in the opposite direction.

4. The attachment of claim 3,
at least one of the engaging edges (82) of said shiftable gear (55) and of said gears (48, 50) engaged thereby being beveled,
and means for maintaining said shiftable gear (55) in manually set position comprising three spaced apart circumferential recesses (64, 66, 68) on said shifting gear male shaft (54),
and yieldable detent means (58, 62) in one said housing side (28) engaging within a selected one of said recesses.

5. The attachment of claim 4, said housing (30) comprising
three substantially equal walls (FIG. 7) joined by round edges enclosed by
two flat opposite sides (28, 32) of substantially equilateral triangular shape, said flat sides being said opposite sides (28, 32) into which said shafts (44, 52, 56) extend,
the openings (FIG. 8) in said flat sides for said shafts forming an equilateral triangle.

References Cited
UNITED STATES PATENTS
2,795,965   6/1957   Hinton _____ 74—355

ROBERT M. WALKER, *Primary Examiner.*
LEONARD H. GERIN, *Examiner.*